United States Patent Office 2,802,353
Patented Aug. 13, 1957

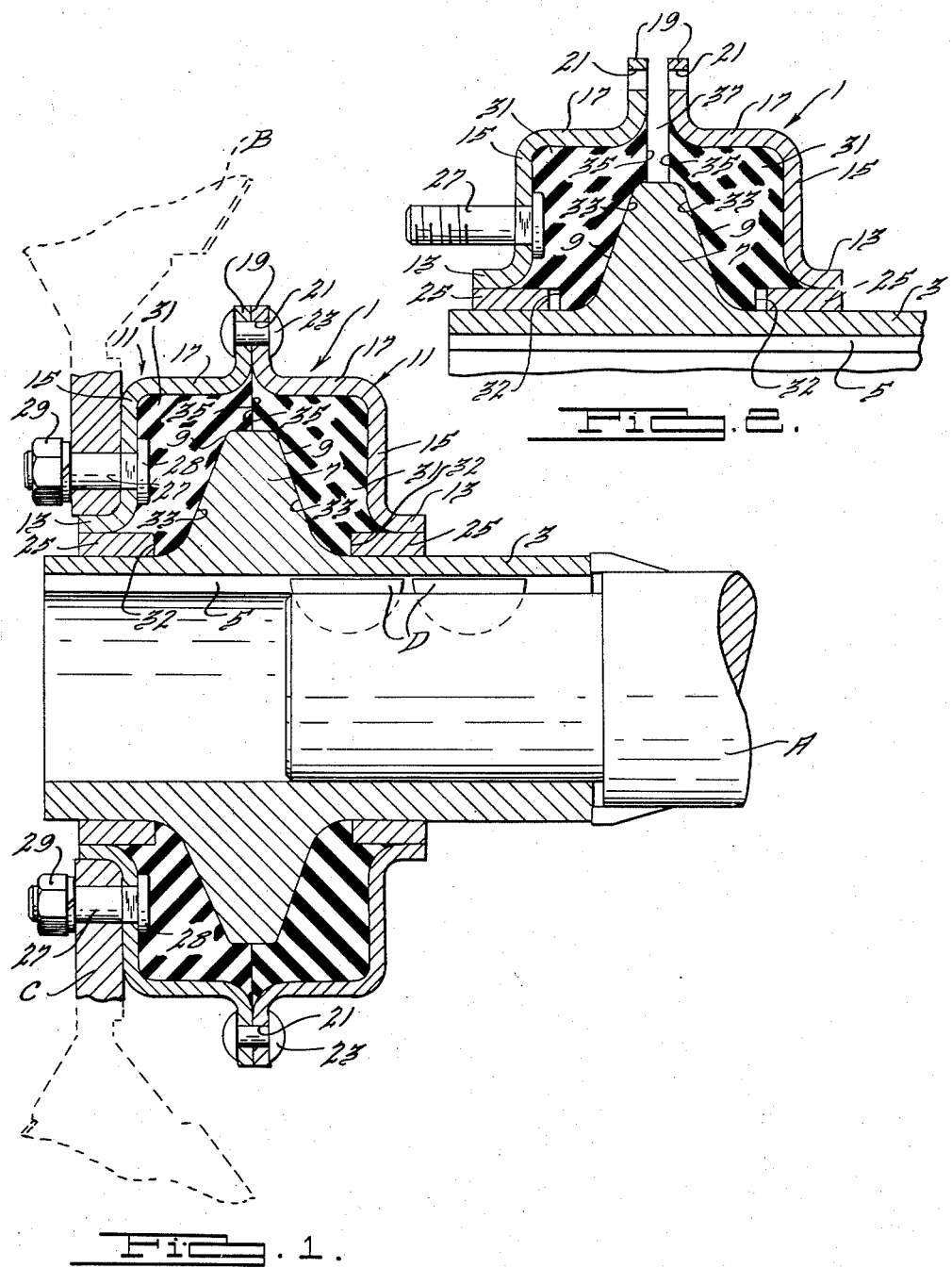

2,802,353

FAN DRIVE INSULATOR ASSEMBLY

Thomas H. Peirce, Detroit, Mich., assignor, by mesne assignments, to Thomas H. Peirce, doing business as H. A. King Company, Detroit, Mich.

Continuation of application Serial No. 140,899, January 27, 1950. This application July 25, 1952, Serial No. 300,954

1 Claim. (Cl. 64—27)

This invention relates to torque transmitting rubber mountings for fan blades and, in particular, to fan mountings adapted for use in internal combustion engines. This application is a continuation of applicant's copending application, Serial No. 140,899, filed January 27, 1950, entitled Fan Drive Insulator Assembly and now abandoned.

It is an object of the invention to improve the operating characteristics, such, for example, as related to torque transmittal and vibration damping, of mountings of the type indicated.

Another object is to increase the durability and life of mountings of this type.

Another object is to provide a rubber fan mounting assembly that inherently tends to maintain the rotary parts in close concentricity.

The invention contemplates a radially split retainer and flanged hub arranged so that a torque transmitting rubber mass therebetween is in a state of axial compression. The rubber mass, which is preferably bonded to the retainer, fills the radial space between the hub and retainer so that substantially no radial expansion thereof takes place when it is axially compressed. Means are provided for attaching a fan to the retainer and this is preferably arranged so that radius of the force transmitted to the fan with respect to the axis of the hub is less than the maximum radius of the hub flange.

Other features and objects of the invention will appear in conjunction with a description of the accompanying drawings which illustrate one form of the invention, wherein:

Figure 1 is an axial section through a fan mounting embodying the principles of the invention; and Figure 2 is a partial section similar to that of Figure 1 illustrating the means whereby axial compression is created in the rubber mass.

The fan mounting 1 is adapted to transmit torque from the crankshaft A to a fan B which, for example, may comprise a plurality of blades extending radially from a mounting ring C.

The mounting 1 includes a hub 3 that has a longitudinal keyway 5 therein adapted to receive keys D, whereby the hub may be driftably secured to the shaft A to receive torque therefrom. While the hub 3 may be constructed in various ways, it preferably has an integral outwardly extending radial flange 7 formed thereon which desirably has radial faces 9 that taper toward each other.

Surrounding and coaxial with the hub is a split retainer made up of two complementary covers 11 that are identical in shape. Their preferred conformation provides them with an axial innermost portion or flange 13 that is cylindrical and joined to an inner radial portion 15 that in turn is joined to an axial and cylindrical portion 17 and terminates in an outer flange portion 19 that is radial. The outer flange portions 19 of the covers 11 have registering holes 21 whereby the covers may be clamped together by rivets 23, or other suitable means. Preferably, but not necessarily, the radially innermost edges of the covers, consisting herein of the inner peripheries of portions 13, are radially spaced from the surface of the hub 3 to provide bores into which the bearing rings 25 are pressed. These rings, or bushings, are rotatable and axially movable with respect to the hub and, therefore, are preferably constructed of a material that has a low coefficient of friction relative to the hub material; e. g., bronze rings and steel hub. It will be observed that the rings transmit no torque from the hub to the retainer, but serve to prevent tilting of the fan B, as well as provide quiet operation.

The fan ring C is secured to the outer face of the inner radial flange 15 of one of the covers 11. For this purpose, studs 27 are affixed in the cover. The studs preferably extend through holes in the cover and have heads 28 on the inside face thereof. The ring C is clamped on the cover by nuts 29 that thread on the ends of the studs 27. It will be observed that the studs are located radially inwardly from the cover portions 11 and preferably are radially inwardly from the outermost periphery of the hub flange 7.

Vibration is damped and torque is transmitted from the hub 3 to fan B by a rubber mass that is contained in the chamber defined by the hub and retainer or covers. Preferably, but not necessarily, the rubber is bonded to the covers 11. The rubber mass is preferably, but not necessarily, in two sections 31 that are associated with each of the covers 11, and if the rings 25 are used they are provided in molding with suitable annular slots 32 that receive the rings, which may be somewhat longer, if desired, than the space needed for the rings, so as to provide room for compressed rubber. The rubber sections 31 have inclined faces 33 that are adapted to abut the tapered flange faces 9 and faces 35 that are in the plane of outer flanges 19. The faces 33 are spaced from the inner faces of cover portions 15 by an axial distance which is greater than the axial distance between the flange faces 9 and the inner faces of the covers 11 when the covers are clamped together. Thus, in the absence of axial compression on the covers, their outer flanges 19 and the rubber faces 35 are axially spaced apart, as shown in Figure 2 at 37, even though the rubber is in engagement with the flange faces 9. The rubber mass completely fills the radial space between the inner surfaces of the cover portions 17 and the outer surface of the hub 3. Hence, when the covers 11 are clamped together by rivets 23, the rubber mass is axially compressed between the covers 11 and the flange faces 9 but radial expansion thereof is prevented so that the excess rubber flows into spaces 37 and 32. In this state of axial compression (which is most beneficial when the hub flange 7 is tapered, as illustrated), the rubber exhibits superior characteristics from the standpoint of durability, torque transmittal, and damping. Best results will be obtained when, as indicated above, the studs 27 are located radially inwardly of the outer periphery of flange 7. It will be observed that the side edges or peripheries of the embedded heads 28 of the studs 27 serve to transmit torque from the rubber to the retainer, and tend to reduce shearing forces in the plane of adherent engagement between the rubber mass and cover 11.

A particularly important feature resides in the state of radial compression that exists in the rubber mass due to its confinement against radial expansion. The radial stresses are substantially uniform and therefore concentrically align the retainer 11 and hub. This feature is of special significance when the rubber is bonded to the retainer. In this case, shrinkage or drift in the rubber coming out of the mold often causes a nonuniform residual stress condition that would, in ordinary designs, result in misalignments that serve to accentuate vibrations. This condition is overcome by the superposed radial compression created in the rubber by the structure of this invention. The radial compression, in addition to improving circumferential flexibility, also stiffens the rubber in a radial direction and resists tilting due to the eccentric loading by the fan blade.

Modifications within the spirit and scope of the invention will appear to those in the art, hence it is not intended to limit it to the specific structure shown herein by way of illustration. It is obvious, for example, that degrees of vibration can be obtained by changing the type of rubber employed or the amount of axial compression. Other changes will also be evident to those practicing the invention.

What is claimed is:

In a fan mounting, a rotatable hub having an outwardly extending radial flange, a retainer surrounding the hub and radially spaced therefrom, a rubber mass surrounding said flange and interconnecting the retainer and hub providing a resilient torque transmitting connection therebetween, said mass being in a state of substantial radial and axial compression, and torque transmitting members on the retainer located radially inwardly of the outer periphery of the rubber mass adapted to be operatively secured to a fan, said members having a portion embedded in the rubber mass adapted to transmit torque from the rubber mass to the retainer to reduce shearing forces in the plane of adherent engagement between the rubber mass and said retainer.

References Cited in the file of this patent

UNITED STATES PATENTS

| | | |
|---|---|---|
| 1,670,369 | MacPherson | May 22, 1928 |
| 1,772,915 | Roseberg | Aug. 2, 1930 |
| 1,803,937 | Jansson | May 5, 1931 |
| 1,949,520 | Whisler | Mar. 6, 1934 |
| 2,041,555 | Lee | May 19, 1936 |
| 2,097,318 | Dowell | Oct. 26, 1937 |
| 2,126,708 | Schmidt | Aug. 16, 1938 |
| 2,164,485 | Yantie | July 4, 1939 |
| 2,473,335 | Hardy | June 14, 1949 |
| 2,482,488 | Julien | Sept. 20, 1949 |
| 2,492,029 | Beier | Dec. 20, 1949 |

FOREIGN PATENTS

| | | |
|---|---|---|
| 486,917 | Great Britain | June 7, 1938 |